UNITED STATES PATENT OFFICE.

JAMES C. ANDERSON, OF HIGHLAND PARK, ILLINOIS.

COMPOSITION FOR ORNAMENTAL BRICK.

SPECIFICATION forming part of Letters Patent No. 424,252, dated March 25, 1890.

Original application filed November 26, 1888, Serial No. 291,932. Divided and this application filed December 21, 1888. Renewed March 1, 1890. Serial No. 342,207. (No specimens.)

*To all whom it may concern:*

Be it known that I, JAMES C. ANDERSON, a citizen of the United States, residing at Highland Park, in the county of Lake and State of Illinois, have invented new and useful Improvements in Compositions for the Manufacture of Ornamental Brick; and I do hereby declare the following to be a full, clear, and exact description of said invention.

My invention relates to a composition of matter for the manufacture of ornamental bricks for achitectural and other purposes; and the object of my invention is to produce bricks of a highly-ornamental character, having the main body to present the appearance and character of brass, showing the actual dross of the metal upon the surface thereof in the form of spots or blotches.

In carrying out my invention and to produce the best results a pure clay is used in which there is none or practically none of the metallic oxides and which in its natural state will burn to a white or slightly-buff color.

The clay is reduced to a fine dry powdered condition by any suitable mechanical means, and to each one hundred (100) parts I add about five (5) parts of brass in a finely divided or comminuted condition in the form of coarse filings or sawings or fine chippings, and intimately mix the same with the previously-prepared clay powder, so as to form a homogeneous mass. The clay and finely-disintegrated brass thus prepared are subjected to an intense pressure while in a dry state in suitable molds to bring them to the desired form and to eliminate the air therefrom. The bricks, blocks, or other shapes thus formed are now placed in a suitable kiln and fired to a degree of heat which will burn the brick to the desired hardness and fuse the metal, causing it to impart its color to the main body of the brick and at the same time deposit the dross of the metal on the surface of the brick in the shape of spots or blotches.

The different shades of color in the main body of the brick may be varied by changing the proportions of comminuted brass mixed with the clay, or other effects may be obtained by using a small portion of the metallic oxides in a finely-powdered condition thoroughly incorporated with the clay in the dry state, as described in my patent, No. 262,339, of August 8, 1882, before mixing the clay mass with the finely-divided brass.

In bricks produced by this method the main body will be found to possess the same characteristics, color, texture, &c., as metallic brass, with the addition of numerous spots and blisters appearing on the surface of the same, giving it a mottled and highly-artistic appearance. The metals are not oxidized, but fused within the clay body in the metallic state by the burning process and remain in said bodies as metals. The color imparted to the brick does not exhibit the color of the oxide of the metal, but the color of the metal itself and the melted drosses of the metal, which metal colors and drosses go to make up the distinctive character of the brick claimed.

I am aware that it is not new to use the oxides of metal to give color to brick, and such I do not claim.

This application is a division of an application filed by me November 26, 1888, Serial No. 291,932, and in said application I have claimed the brick.

What I claim is—

A composition for the manufacture of brick, consisting of clay and brass, as set forth.

In testimony whereof I affix my signature in the presence of two subscribing witnesses.

J. C. ANDERSON.

Witnesses:
J. F. ANDERSON,
CHARLES B. MCCOY.